United States Patent Office 3,501,481
Patented Mar. 17, 1970

3,501,481
QUASI-14-AZASTEROIDS
John L. Archibald, Windsor, England, and Meier E. Freed, Philadelphia, Pa., assignors to American Home Products Corporation, New York, N.Y., a corporation of Delaware
No Drawing. Filed Dec. 22, 1966, Ser. No. 605,140
Int. Cl. C07d 33/38
U.S. Cl. 260—289      5 Claims

---

ABSTRACT OF THE DISCLOSURE

Quasi-14-azasteroids, such as naphtho[1,2-c]quinolizin-12-ones and bezno[b]pyrrolo[2,1-a]quinolin-11(1H)-ones are prepared having useful pharmacological activity, particularly as C.N.S. depressants and cardiovascular.

---

This invention relates to compounds that are structurally analogous to steroids and processes for making them, and more particularly relates to certain quasi-14-azasteroids having useful pharmacological activity.

An object of the invention is the production of tetracyclic, nitrogen-containing organic compounds having a configuration similar in certain respects to steroidal compounds.

A further object of the invention is to produce quasi-azasteroids having useful pharmacological action which fall within and are illustrated by the following general formula:

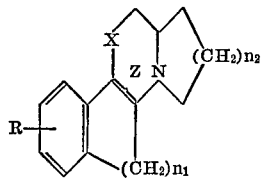

In the above formula the symbol R is intended to represent hydrogen, halogen, hydroxy, a lower alkyl or a lower alkoxy radical. The letter X is intended to represent either carbonyl or hydroxymethylene, while $n_1$ and $n_2$ represent an integer, either 1 or 2, and Z stands for a double bond when X is carbonyl and a single bond when X is hydroxymethylene.

The keto compounds of the invention are prepared by reacting a selected tetralone or indanone with a pyrrolidinyl or piperidyl lower alkyl ester as illustrated below:

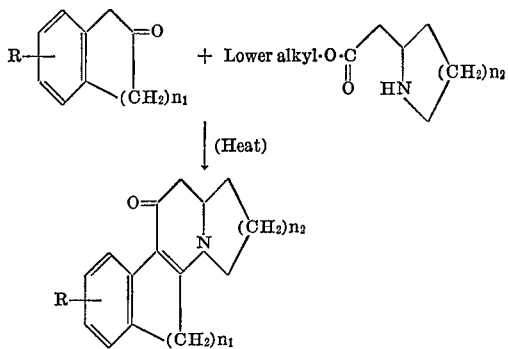

The symbols R, $n_1$ and $n_2$ are the same as indicated previously. This reaction, which may be carried out in a benzenoid solvent under refluxing conditions, produces the keto form of the quasi-steroid.

When this keto reaction product is reduced with a suitable reducing agent, for example, lithium aluminum hydride, the compound formed will have the configuration as follows:

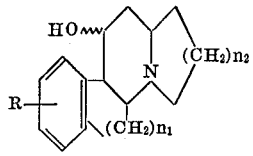

Again R, $n_1$ and $n_2$ have the same meanings as previously indicated. The wavy line connecting the hydroxyl group to the ring carbon is intended to generically represent such a group in the $\alpha$ or $\beta$ configuration or as a mixture thereof.

The compounds of the invention have demonstrated useful pharmacological activity, particularly as central nervous system depressants. In addition, cardiovascular activity has also been demonstrated. The compounds are particularly useful in the field of experimental and comparative pharmacology for their above-stated effects on the animal body.

The compounds are administered either orally or parenterally and in dosage forms where the active ingredient is present to the extent of from 5 to about 50 milligrams per kilogram of body weight. The active ingredient may be combined with a carrier and if desired, with other similarly active substances. With respect to carriers, these may be inert diluents, excipients, extenders or suspending agents.

In the solid form for oral use, the compositions may be either in the form of tablets, capsules or powders, while in the liquid form, for oral or parenteral use an aqueous or oleaginous medium is contemplated.

The following examples illustrate the invention in greater detail and indicate the best mode for carrying out the invention.

EXAMPLE 1

1,3,4,6,7,12,13,13a-octahydro-2H-naphtho[1,2-c] quinolizine-12-one

A mixture of β-tetralone (5.0 g.) and methyl piperidyl-2-acetate (6.2 g.) in xylene (6 ml.) was refluxed under a Dean-Stark water trap for 40 hr. Crystallization occurred on cooling and the crystals were collected. Recrystallization from xylene afforded the product as colorless needles (2.7 g.), M.P. 145–7° C.

Analysis.—Calcd. for $C_{17}H_{19}NO$ (percent): C, 80.57; H, 7.56; N, 5.53. Found (percent): C, 80.69; H, 7.62; N, 5.23.

A similar procedure may be used for preparing 9-methyl - 1,3,4,6,7,12,13,13a - octahydro - 2H - naphtho [1,2-c]quinolizine-12-one, when one substitutes 5-methyl-2-tetralone for the β-tetralone.

EXAMPLE 2

2,3,5,6,12,12a-hexahydrobenzo[f]pyrrolo[2,1-a] quinolin-11(1H)-one

A solution of β-tetralone (5.0 g.) and ethyl pyrrolidinyl-2-acetate (6.2 g.) in xylene (9 ml.) was refluxed under a Dean-Stark water trap for 20 hrs. Excess xylene was distilled out under vacuum and the residue was crystallized from ethyl acetate to give the product (2.0 g.) M.P. 167–8° C.

Analysis.—Calcd. for $C_{16}H_{17}NO$ (percent): C, 80.30; H, 7.16; N, 5.85. Found (percent): C, 80.12; H, 7.29; N, 6.17.

Carrying out the same reaction as disclosed in the example, but substituting 5-chloroindane-2-one for the β-tetralone, one will form the compound, 7-chloro-1,2,3, 10,11-pentahydro-5H-indeno[2,1-e]indolizine-10-one.

EXAMPLE 3

1,3,4,6,7,12,13,13a-octahydro-9-methoxy-2H-naphtho[1,2-c]quinolizin-12-one

The title produce was prepared in the same manner as Example 1 but substituting 5-methoxy-2-tetralone in place of β-tetralone. The product was crystallized successively from ether, ethyl acetate and acetonitrile, M.P. 153–4° C.

*Analysis.*—Calcd. for $C_{18}H_{21}NO_2$ (percent): C, 76.29; H, 7.47; N, 4.94. Found (percent): C, 76.30; H, 7.26; N, 5.23.

EXAMPLE 4

1,3,4,5a,6,7,11b,12,13a-decahydro-2H-naphtho[1,2-c]quinolizine-12-ol hydrochloride A solution of the title compound of Example 1 (2.53 g.) in tetrahydrofuran (50 ml.) was added slowly to a stirred suspension of lithium aluminum hydride (1.14 g.) in tetrahydrofuran (50 ml.). The mixture was refluxed for 3 hrs., then cooled. Water (3.5 ml.) was added dropwise with stirring. The inorganic material was filtered off and the filtrate was evaporated to give a colorless oil. IR showed this to be a mixture of saturated ketone and alcohol. Thin layer chromatography showed two spots, Rƒ .49 and .73. Therefore the oil was re-reduced in the same way as before. The resulting oil was dissolved in ether and made just acid with ethereal HCl. The precipitated hydrochloride (2.3 g.) was recrystallized from acetonitrile to give the product as its hydrochloride salt, M.P. 224–250° (this product is probably a mixture of 12α-ol and 12β-ol—hence the melting range).

*Analysis.*—Calcd. for $C_{17}H_{24}ClNO$ (percent): C, 69.50; H, 8.23; N, 4.77; Cl, 12.07. Found (percent): C, 69.28; H, 8.19; N, 4.72; Cl, 11.9.

The reduced products form acid-addition salts which are generally crystalline products and useful in this form. While hydrochloric acid is preferred, other mineral acids or even organic acids may be used. Thus, suitable non-toxic salts will form with, for example, sulfuric or hydrochloric acids, and with tartaric, fumaric or maleic acids.

We claim:
1. A compound having the formula:

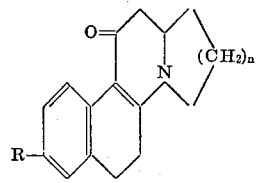

wherein R is a member of the group consisting of hydrogen, halogen, lower alkyl and lower alkoxy; while $n$ is an integer of 1 to 2.

2. A compound of claim 1; wherein R is selected from the group consisting of hydrogen, chlorine, methyl, and methoxy; while $n$ is 2.

3. As a compound of claim 1; 1,3,4,6,7,12,13,13a-octahydro-2H-naphtho[1,2-c]quinolizine-12-one.

4. As a compound of claim 1; 2,3,5,6,12,12a-hexahydro-benzo[f]pyrrolo[2,1-a]quinolin-11(1H)-one.

5. As a compound of claim 1: 1,3,4,6,7,12,13,13a-octahydro-9-methoxy-2H-naphtho[1,2-c]quinolizin-12-one.

References Cited

UNITED STATES PATENTS

| | | | |
|---|---|---|---|
| 2,891,060 | 6/1959 | Rudner | 260—294.7 X |
| 3,210,357 | 10/1965 | Taylor et al. | 260—297 X |

OTHER REFERENCES

British Patent 1,017,700, 1/1966, abstracted in Chem. Abstr., vol. 64, col. 14243 (1966).

Horii et al., abstracted in Chem. Abstr., vol. 66, col. 75898V (1967).

DONALD G. DAUS, Primary Examiner

U.S. Cl. X.R.

260—286, 294.7, 297, 590, 294.3, 326.8